(12) United States Patent
Firman et al.

(10) Patent No.: US 6,281,901 B1
(45) Date of Patent: Aug. 28, 2001

(54) INTERACTIVE OVERLAY FOR DISPLAYING 3-D DATA

(75) Inventors: Carl M. Firman, Sierra Vista, AZ (US); Linda C. Russell, San Diego, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/199,719

(22) Filed: Nov. 25, 1998

(51) Int. Cl.[7] .................................................. G06T 17/00
(52) U.S. Cl. .................................... 345/419; 345/424
(58) Field of Search .................................. 345/418, 419, 345/424, 421, 435

(56) References Cited

U.S. PATENT DOCUMENTS

| | | |
|---|---|---|
| 5,179,638 | 1/1993 | Dawson et al. . |
| 5,315,537 | 5/1994 | Blacker . |
| 5,361,100 | 11/1994 | Teece . |
| 5,363,476 | 11/1994 | Kurashige et al. . |
| 5,381,518 * | 1/1995 | Drebin et al. ................. 345/424 |
| 5,448,687 | 9/1995 | Hoogerhyde et al. . |
| 5,555,356 | 9/1996 | Scheibl . |
| 5,586,231 | 12/1996 | Florent et al. . |
| 5,633,994 | 5/1997 | Kaizuka . |
| 5,657,432 | 8/1997 | Matsui . |
| 5,694,331 | 12/1997 | Yamamoto et al. . |
| 5,729,670 | 3/1998 | Strumolo et al. . |

* cited by examiner

*Primary Examiner*—Cliff N. Vo
(74) *Attorney, Agent, or Firm*—Harvey Fendelman; Eric James Whitesell; James A. Ward

(57) ABSTRACT

An interactive overlay for displaying 3-D data of the present invention provides a method for analyzing 3-D data by superimposing an adjustable, semi-transparent bounding surface on a display of the 3-D data. The bounding surface makes visually apparent nulls on the 3-D data surface that fall below the selected value of the bounding surface. The bounding surface also provides a visual reference for estimating relative magnitudes.

9 Claims, 3 Drawing Sheets

INTERACTIVE OVERLAY FOR DISPLAYING 3-D DATA

The invention described below is assigned to the United States Government and is available for licensing commercially. Technical and licensing inquiries may be directed to Patent Counsel, SPAWARSYSCEN SAN DIEGO CODE D0012 Room 103, 53560 Hull Street, San Diego, Calif. 92152-5001; telephone no. (619)553-3001; fax no. (619) 553-3821.

BACKGROUND OF THE INVENTION

The present invention relates to methods for displaying 3D (three-dimensional) data in a two-dimensional space. More specifically, but without limitation thereto, the present invention relates to a method for displaying 3-D data on a video display terminal and overlaying the 3-D data with an interactively adjustable visual boundary surface.

In evaluating the performance of an antenna design, it is desirable to examine the far field pattern radiated by the antenna. The far field radiation pattern may be computed using electromagnetic equations and by measuring the antenna pattern at an antenna pattern range. The far field radiation pattern of an antenna defines the performance of the antenna for a given environment. If the antenna is situated in free space, then it has an associated ideal radiation pattern. In practical applications, however, the antenna is surrounded by interfering structures. For example, high frequency (HF) antennas on a ship are interfered with by the structure of the ship. A measurement of the antenna pattern is typically made by modeling the antenna and the ship on which the antenna is mounted to determine how the structure of the ship affects the antenna pattern. Energy from the radiating antenna couples into the structure of the ship and is re-radiated, creating blockages or nulls in the antenna pattern that may result in extreme degradation of the far field antenna pattern.

An antenna pattern test range typically includes a small scale model of the antenna, the interfering structures, and an electromagnetic sensor. The sensor is typically moved along a track to measure the relative magnitude and phase of electromagnetic radiation transmitted by the antenna at a wavelength appropriate to the scale of the model. The signal received by the sensor is measured over a wide range of elevation and azimuth angles as the sensor is moved along the track. The sensor relays the measurements to a data logger that records the data in a file for analysis and display.

The performance of a communications system is closely linked to the performance of its antennas. A need therefore exists for a method to evaluate antenna performance and to identify any blockages or sidelobes in the antenna pattern.

SUMMARY OF THE INVENTION

The present invention is directed to overcoming the problems described above, and may provide further related advantages. No embodiment of the present invention described herein shall preclude other embodiments or advantages that may exist or become obvious to those skilled in the art.

An interactive overlay for displaying 3-D data of the present invention provides a method for analyzing 3-D data by superimposing an adjustable, semi-transparent bounding surface on a display of the 3-D data. The bounding surface makes visually apparent nulls on the 3-D data surface that fall below the selected value of the bounding surface. The bounding surface also provides a visual reference for estimating relative magnitudes.

An advantage of the interactive overlay for displaying 3-D data of the present invention is that nulls and peaks in a complex 3-D surface relative to a selected threshold value may be visually recognized.

The features and advantages summarized above in addition to other aspects of the present invention will become more apparent from the description, presented in conjunction with the following drawings.

DESCRIPTION OF THE INVENTION

The following description is presented solely for the purpose of disclosing how the present invention may be made and used. The scope of the invention is defined by the claims.

Figure 1:
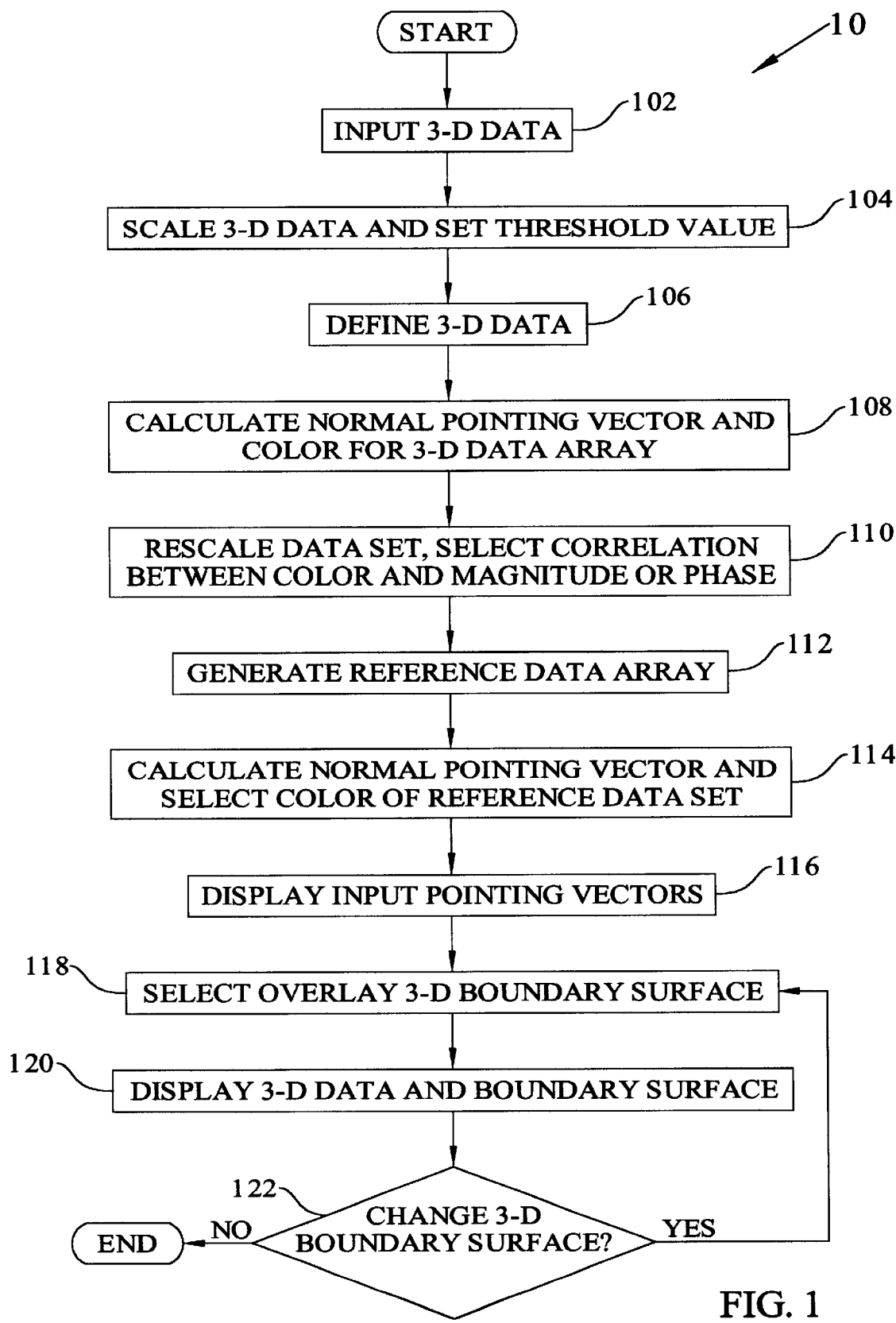
FIG. 1 is a flow chart of a computer program for displaying 3-D data with an interactive overlay of the present invention.

FIG. 1 is a flow chart 10 of a computer program of the present invention for displaying 3-D data such as antenna radiation patterns, electromagnetic patterns, and the like with an interactive overlay. Electromagnetic sensor data samples comprising magnitude, phase, elevation angle, and azimuth angle are input at step 102. The data samples are then scaled and thresholded at step 104, for example, by normalizing the data to the largest magnitude and discarding scaled samples below a selected threshold. A 3-D data array of the scaled and thresholded data samples is defined at step 106, for example, by mapping the elevation and azimuth angles of each data sample into spherical coordinate values for $\theta$ and $\phi$, respectively, and the magnitude values into values for r. Alternatively, the data samples may be mapped into Cartesian coordinates to define the 3-D array.

To render a 3-D effect on a two dimensional display, graphics software packages typically require a normal pointing vector for each vertex of a surface mesh. Accordingly, normal pointing vectors are calculated at step 108 including a color hue at each vertex for the corresponding phase value. At step 110, the data may be rescaled by the user. A color hue may be selected for emphasizing magnitude instead of indicating phase.

At step 112, a reference data set may be generated from, for example, a well known mathematical function and mapped into a 3-D reference array. The reference data set may be, for example, an ideal radiation pattern.

At step 114, normal pointing vectors are calculated for the 3-D reference array and a color selected to provide a visual distinction between the reference array and the data array.

At step 116, the data array and the reference array pointing vectors are input to, for example, commercially available graphics display software, and displayed for visual analysis.

At step 118, an overlay is selected interactively and superimposed on the display. The overlay may be, for example, a semi-transparent grid or boundary surface having a selected magnitude.

At step 120, the displayed data and reference arrays are visually analyzed with the selected overlay.

At step 122, the user is provided an opportunity to select a different overlay. If another overlay selection is made, steps 118, 120, and 122 are repeated until the visual analysis is complete.

Figure 2:
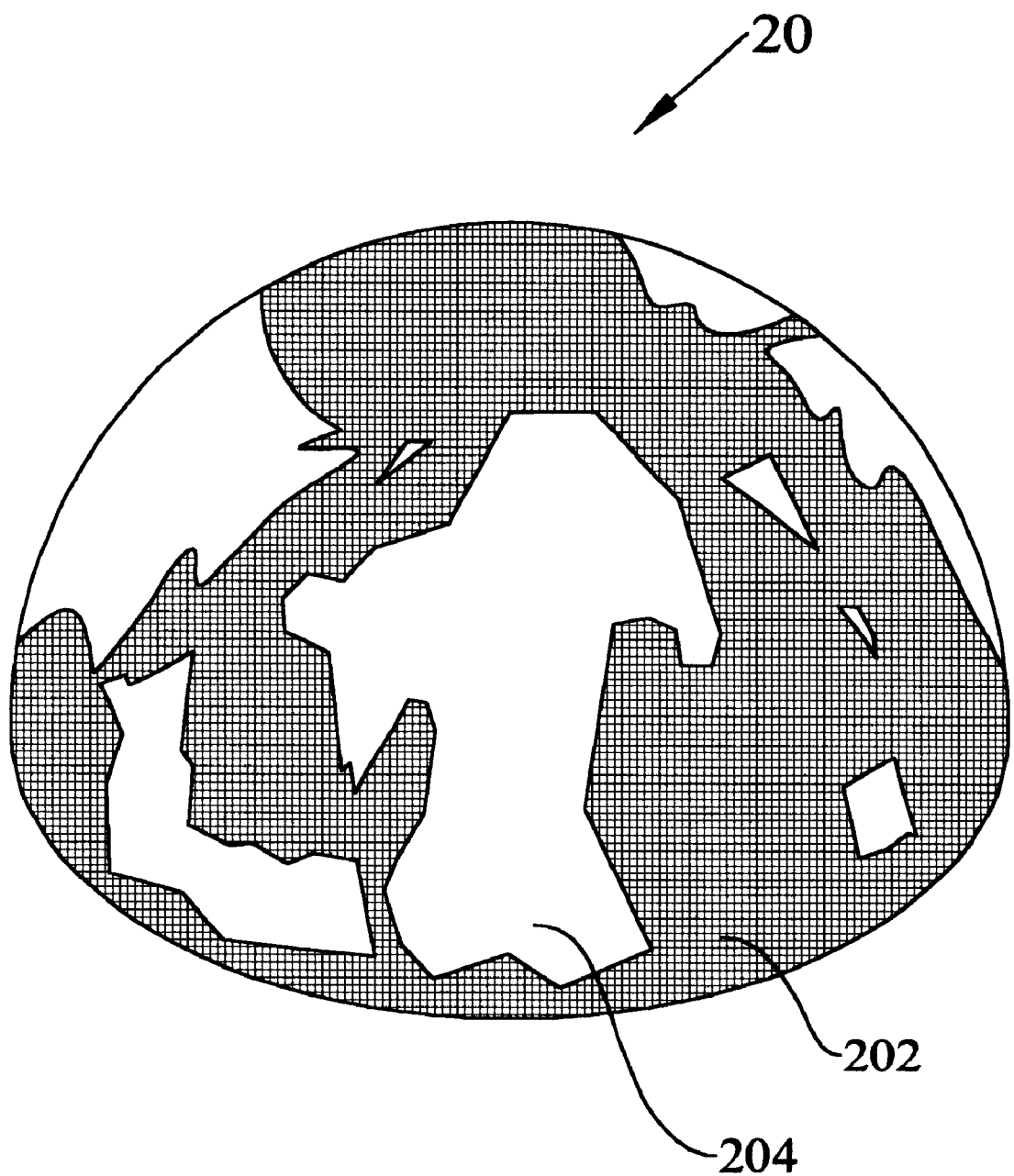
FIG. 2 is an illustration of an antenna radiation pattern display with an interactive overlay of the present invention.

FIG. 2 is an illustration of an antenna radiation pattern display 20 with an interactive overlay of the present invention. Antenna radiation pattern 202 appears as a surface of peaks and valleys representative of radiated power magnitude at different positions. Interactive overlay 204 appears as a translucent surface having a constant magnitude that may adjusted interactively to show what portions of antenna radiation pattern 202 exceed the selected magnitude.

Figure 3:
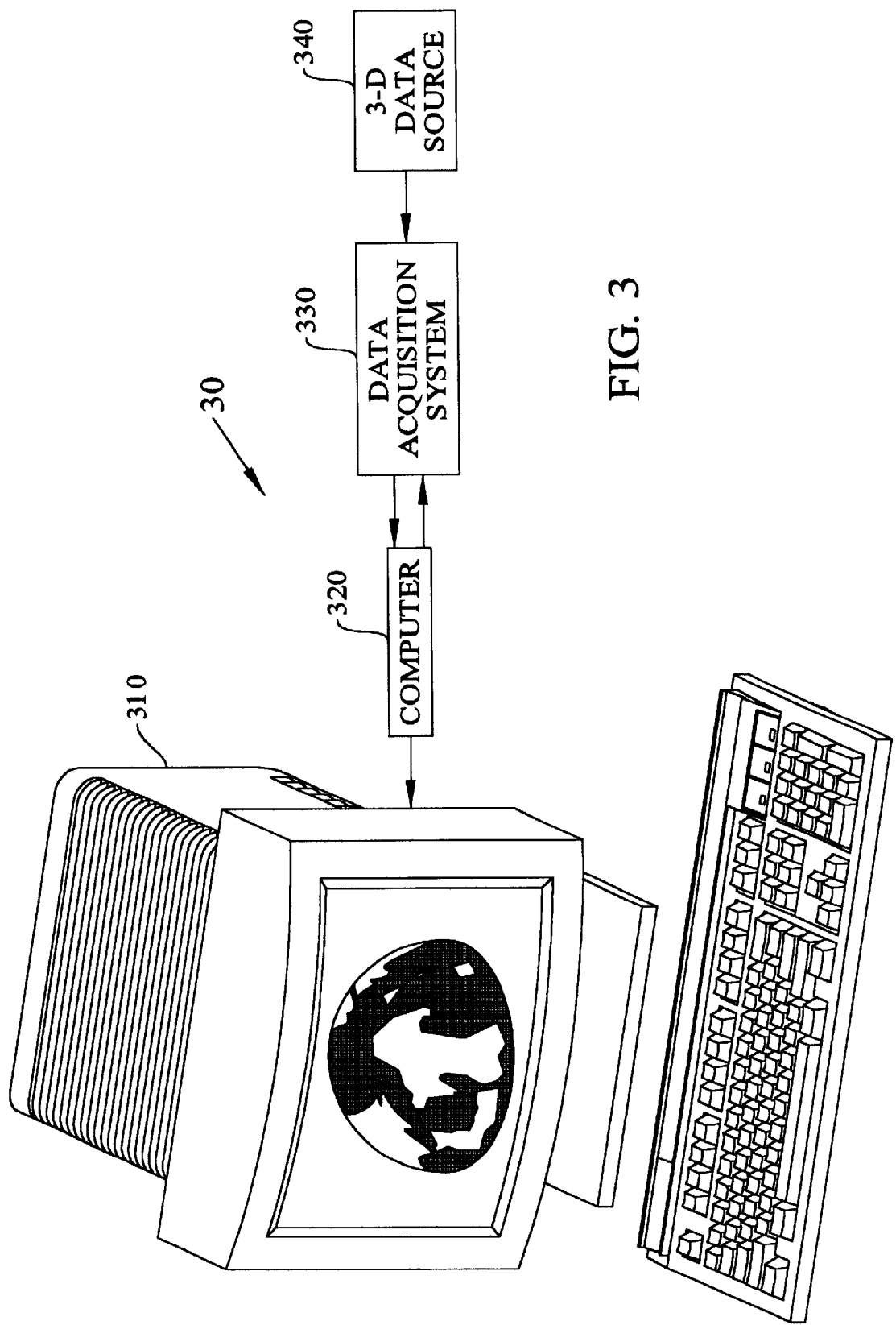
FIG. 3 is a diagram of a desktop computer configuration for implementing a computer product of the present invention.

Flow chart 10 shown in FIG. 1 may be implemented as a computer program product on a medium for installing on a typical desktop computer. FIG. 3 is a diagram of a desktop computer configuration 30 for implementing a computer product of the present invention. A data acquisition system 330 inputs 3-D data from a 3-D data source 340 and digitizes the data for input to a computer 320. 3-D data source 340 may be, for example, an antenna modeling range. Computer 320 controls data acquisition system 330 and displays the 3-D data on a display 310 for analysis. Computer 320 may optionally display an interactive overlay with the 3-D data as described above.

Other modifications, variations, and applications of the present invention may be made in accordance with the above teachings other than as specifically described to practice the invention within the scope of the following claims.

We claim:

1. A method for displaying 3-D data representing a 3-dimensional surface in two dimensions comprising the steps of:

storing a first array of the 3-D data representing 3-dimensional signal radiation characteristics of a signal radiator;

accepting first interactive user selection data representing a user selection of a 3-dimensional reference surface value;

storing a second array of reference data corresponding to the first interactive user selection data;

calculating a third array of two-dimensional display data derived from the first and second data arrays;

displaying a visual representation of the third data array;

accepting second interactive user selection data representing a user selection of a 3-dimensional boundary surface value;

adding to the third data array a fourth array of overlay data corresponding to the second interactive user selection data; and repeating the displaying and adding steps responsive to one or more additional second interactive user selection data accepting steps.

2. The method for displaying 3-D data of claim 1 wherein the first array of 3-D data represents an electromagnetic radiation pattern.

3. The method for displaying 3-D data of claim 1 further comprising the steps of:

generating a 3-D reference array; and displaying the reference array as an overlay on the displayed 3-D data array.

4. The method for displaying 3-D data of claim 1 further comprising the step of:

generating pointing vectors and associated colors of each array.

5. A computer program product for use with a display system for displaying 3-D data representing a 3-dimensional surface in two dimensions, the computer program product comprising:

a machine-readable recording medium;

first means, recorded on the recording medium, for directing the display system to store a first array of the 3-D data representing 3-dimensional signal radiation characteristics of a signal radiator;

second means, recorded on the recording medium, for directing the display system to accept first interactive user selection data representing a user selection of a 3-dimensional reference surface value;

third means, recorded on the recording medium, for directing the display system to store a second array of reference data corresponding to the first interactive user selection data;

fourth means, recorded on the recording medium, for directing the display system to calculate a third array of two-dimensional display data derived from the first and second data arrays;

fifth means, recorded on he recording medium, for directing the display system to display a visual representation of the third data array;

sixth means, recorded on the recording medium, for directing the display system to accept second interactive user selection data representing a user selection of a 3-dimensional boundary surface value; and seventh means, recorded on the recording medium, for directing the display system to add to the third data array a fourth array of overlay data corresponding to the second interactive user selection data.

6. The computer program product of claim 5 wherein the first array of 3-D data represents an electromagnetic radiation pattern.

7. The computer program product of claim 5 further comprising:

means, stored in the memory means, for directing the display system to display a 3-D reference array as an overlay on the first 3-D data array.

8. The computer program product of claim 5 further comprising:

means, stored in the memory means, for directing the display system to generate the pointing vectors and associated colors of each data array.

9. A display system for displaying 3-D data representing a 3-dimensional surface in two dimensions, comprising:

a computer;

a data acquisition system coupled to the computer;

a source of 3-D data coupled to the data acquisition system;

a display coupled to the computer;

memory means in the computer for storing binary program instructions;

first means, stored in the memory means, for directing the display system to store a first array of the 3-D data representing 3-dimensional signal radiation characteristics of a signal radiator;

second means, stored in the memory means, for directing the display system to accept first interactive user selection data representing a user selection of a 3-dimensional reference surface value;

third means, stored in the memory means, for directing the display system to store a second array of reference data corresponding to the first interactive user selection data;

fourth means, stored in the memory means, for directing the display system to calculate a third array of two-dimensional display data derived from the first and second data arrays;

fifth means, stored in the memory means, for directing the display system to display a visual representation of the third data array;

sixth means, stored in the memory means, for directing the display system to accept second interactive user selection data representing a user selection of a 3-dimensional boundary surface value; and seventh means, stored in the memory means, for directing the display system to add to the third data array a fourth array of overlay data corresponding to the second interactive user selection data.

* * * * *